United States Patent [19]

Carlough

[11] Patent Number: 5,283,689
[45] Date of Patent: Feb. 1, 1994

[54] OPTICAL SIGHTING DEVICE

[76] Inventor: Warren A. Carlough, 5 Old Forge La., Pittsford, N.Y. 14534

[21] Appl. No.: 729,592

[22] Filed: Jul. 15, 1991

[51] Int. Cl.$^5$ .............................................. G02B 23/00
[52] U.S. Cl. ..................... 359/427; 359/428; 356/247
[58] Field of Search ............... 359/428, 424, 362, 427; 356/251–253, 247

[56] References Cited

U.S. PATENT DOCUMENTS

| | | | |
|---|---|---|---|
| 3,023,504 | 3/1962 | Benford | 359/428 |
| 3,506,329 | 4/1970 | Weaver | 359/424 |
| 3,782,822 | 1/1974 | Spence | 359/428 |

Primary Examiner—Bruce Y. Arnold
Assistant Examiner—James Phan
Attorney, Agent, or Firm—Hoffman Stone

[57] ABSTRACT

The sighting device may include a reticle and a strongly magnifying lens or lens segment positioned along the line of slight. The lens, or segment blocks out a part of the object field and focusses an image of the reticle on the user's retina. Alternatively, a holographic image of the reticle may be used in place of the reticle-lens combination. The device may also include a Galilean telescope with the magnifying lens segment positioned at the eyelens and the reticle adjacent to the objective.

5 Claims, 1 Drawing Sheet

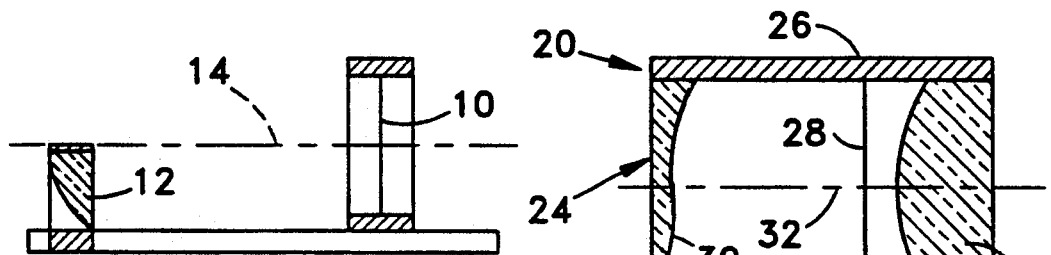
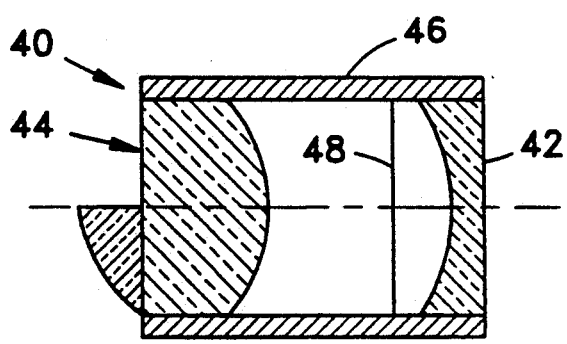
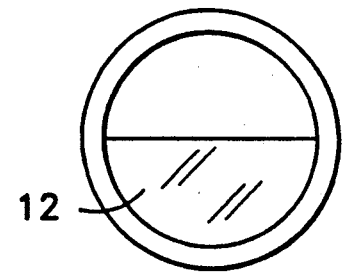
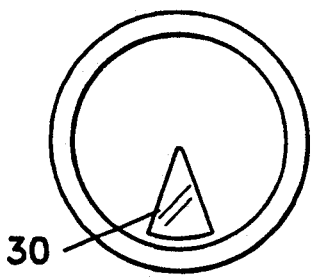
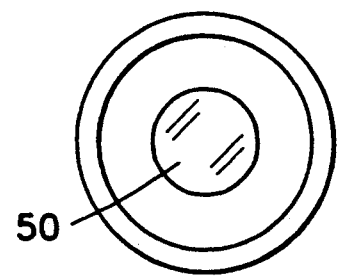
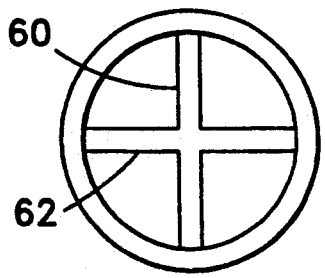
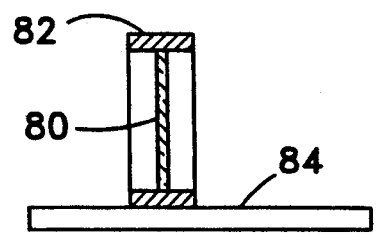

OPTICAL SIGHTING DEVICE

This invention relates to an optical sighting device for use in any of many different applications such as, for example, optical gun sights, archery sights, transits, and theodolites. More particularly, it relates to a device of this kind especially suitable for use in applications where it is desired to make the sight relatively short in the sighting direction.

The invention, in its broadest concept, contemplates the use of a reticle and an optical element for imaging the reticle in the user's eye while blocking out a portion of the object field. The optical element may be a magnifying lens, or lens segment, of relatively high power between the user's eye and the reticle, blocking out a portion of the object field in line with the reticle, and replacing it with a magnified image of the reticle. A relatively large part of the object field is left unobstructed so that the user sees both his target and the magnified image of the reticle.

Alternatively, the optical element may be simply a hologram containing preferably only an image of the reticle, in which case the hologram constitutes both the reticle itself and the optical element for imaging it.

The invention came about during efforts to improve archery bowsights. Bowsights heretofore available included a body having a peephole for mounting upon the bowstring, and one or more auxiliary aiming points mounted on the bow handle. The archer, looking through the peephole, lines up the center of the peephole and a selected one of the points with the target. The arrangement was found to be unsatisfactory when the ambient light became dim, especially near dawn and at dusk. The first step, therefore, was to enlarge the peephole to admit more light, but then it became difficult or impossible for lack of a reference at the eye position to aim accurately. A reticle was needed, but if it was mounted in the relatively short space available at the bowstring the archer could not focus his vision on it, particularly when he had to focus simultaneously on a distant target. Also to be considered was the desire of some archers for a degree of magnification or minification in the sight for the object field.

In cases where optical power was not needed for viewing the object field it was found that a reticle in the form of a relatively fine wire could be fixed across the diameter of the enlarged peephole at its object end, and a small, strongly magnifying lens, or lens segment mounted at its ocular end. The lens, or segment, was made small enough not to obscure the entire object field, but to allow the archer to see the target clearly. It was also made with enough power to focus a magnified image of the wire in the user's eye. One edge of the lens was positioned approximately on the central optical axis of the peephole so that the magnified image of the wire appeared to the archer to end near the center of his field of view.

Alternatively, in these cases a holographic image of the reticle may be used showing the reticle at any desired distance from the user's eye, preferably closer than the auxilliary aiming point, or points such as the sight points used in archery. The holographic image is mounted on a transparent base and fitted within a relatively large peephole.

The next problem was to add optical power to control the apparent size of images in the object field. Surprisingly, it was found that a Galilean telescope filled the bill. First, it can be very short so it can readily be designed to fit within the short space available for a bowstring peephole. And, second, despite universal agreement in the optical profession that a reticle cannot be used with a Galillean telescope, the magnifying lens of the invention accommodates the reticle completely satisfactorily, and the hologram also operates very well with telescope. The magnifier is mounted adjacent to the eyelens of the telescope and operates as described hereinabove to block out a part of the object field and substitute for it a magnified image of the reticle, which is mounted close to the objective lens, or upon it. Similarly, the hologram blocks out a portion of the object field directly in line with the image of the reticle, leaving the rest of the field unobscured.

DETAILED DESCRIPTION

Illustrative embodiments of the invention will now be described in conjunction with the drawing, wherein;

FIG. 1 is a schematic optical diagram of a sighting device according to a first embodiment of the invention, showing the device in its simplest form including as necessary parts only the reticle, the magnifying lens and mounting means;

FIG. 2 is a schematic optical diagram of a slighting device according to second embodiment of the invention, showing it as arranged in a Galilean telescope of the magnifying kind;

FIG. 3 is a schematic optical diagram of a sighting device according to a third embodiment of the invention, showing it as arranged in a Galilean telescope of the minifying kind;

FIG. 4 is an end elevational view of either one of the devices of FIGS. 2 and 3, looking at the ocular end of the device;

FIG. 5 is generally similar to the view of FIG. 4, but shows a magnifying lens segment of a different, presently preferred shape;

FIG. 6 is an end elevational view, again looking in the viewing direction, of yet another embodiment showing a lens segment mounted in alignment with the central optical axis;

FIG. 7 is an end elevational view of yet another embodiment of the invention, this one having orthogonally mounted wire, or line reticle elements; and FIG. 8 is a schematic optical diagram of a sighting device according to yet another embodiment of the invention, illustrating the use of a holographic image of a reticle.

Referring first to FIG. 1, a sight according to the first embodiment is very, very simple, including only a reticle 10, which may be a fine wire as shown, a lens segment 12 spaced along a central optical axis 14 from the reticle, and means not separately designated of any desired kind for mounting the reticle and the lens segment. The lens segment 12 is of a relatively high positive power, such as, for example, about 20× to about 30× so that when the user's eye is brought within an inch or two of the segment, and the distance from the segment to the reticle 10 is on the order of half an inch, as it would be in a typical bowsight according to the invention, an image of the reticle 10 is focussed on the user's retina through the lens segment 12. The upper edge of the lens segment 12 lies on or close to the central optical axis 14 so the user views the object field directly in all areas above the lens segment 12 and the image of the reticle 10 on the retina ends near the central axis.

By fortunate coincidence, the optical distortions in this arrangement, primarily curvature of field, are such that the image of the reticle appears to be triangular or trapezoidal, being broader at its base at the edge of the viewer's field, and narrowing almost to a point at the central optical axis. A variety of effects are possible by selecting various different shapes for the lens segment 12. It may be of any desired shape, such as semi-circular, or triangular, for example, a matter of designer's choice.

In a second illustrative embodiment of the invention as shown in FIG. 2, the lens segment 30 is arranged in a Galilean telescope 20 of the magnifying type having an objective lens 22 of positive power, and an ocular 24 of negative power, both mounted in a barrel 26. A reticle 28 in the form, again, of a fine wire, is stretched across the diameter of the barrel 26 either on the inner surface of the objective lens 22 or fairly close to it. A strongly magnifying semi-circular lens segment 30 takes the place of one-half of the ocular 24 with its upper edge approximately coincident with the central optical axis 32.

A third illustrative embodiment, shown in FIG. 3, has the invention mounted in a Galilean telescope 40 of minifying power with an objective 42 of negative power and an ocular 44 of positive power, both supported in a barrel 46. The reticle 48 is either supported on a surface of the objective 42 or, as shown, attached to the barrel 46 fairly close to the objective. In this connection it may be noted that it is usually preferred to mount the reticle within the barrel 46 to protect it from accidental damage, although its actual position is a matter of designer's choice.

FIGS. 4, 5, and 6 illustrate three different shapes for the lens segment 12, 30, or 50. In FIG. 4 the segment is semi-circular, giving the user an impression similar to looking over a fence at the target. In FIG. 5 the segment is generally triangular, like a piece of pie, giving the user a broader view of the object field and permitting a relatively large amount of light to illuminate it, giving a more brilliant image of the object field than the semi-circular shape of FIG. 4.

In FIG. 6, the segment is circular and is supported centrally, being aligned with the central optical axis. In this case the reticle should extend across only a radius of the object field and end at the optical axis. This arrangement is believed to be less desirable than the segment shapes of FIGS. 4 and 5 because the circular, centrally mounted segment does not block out any part of the object field but merely superimposes a magnified image of the reticle upon the image of the object field. This leads to undesired effects under certain lighting conditions; especially when the object field is brilliant it sometimes becomes very difficult to see the magnified image of the reticle.

FIG. 7 illustrates a feature of the invention using a conventional cross-hair reticle (not shown). In this case two lens segments 60 and 62 are used, each of the segments being in the form of a relatively narrow strip extending across a diameter of the ocular end of the sight. The segments are orthogonal to each other, each one being parallel to and aligned with one of the cross-hairs of the reticle. In the case where optical power is desired in the sight, the two segments 60 and 62 are preferably molded integrally with the ocular lens of the Galilean telescope.

The embodiment shown in FIG. 8 includes a photographically produced hologram 80 mounted on a flat glass plate (not separately referenced) which is fitted in a ring 82. The hologram includes a relatively large image of a selected reticle apparently spaced from the user's eye a sufficient distance to enable him to bring it into focus. The ring 82 may be shaped to be held in a bowstring in the usual manner of mounting a peephole body, or it may be fixed to a support plate 84 for mounting on an article other than an archery bow such as, for example, a gun, or a transit.

In another embodiment of the invention the magnifier is cylindrical in shape, sharply convex toward the user, and flat on the side facing the target. The reticle in this instance is scribed and inked on the flat face of the magnifier. The device resembles the common thermometer in which a cylindrical lens magnifies the thermally responsive column of liquid. In this case, also, the magnifier and reticle extend only to about the center of the user's field of view.

In an actual embodiment of the invention conforming to the one shown in FIG. 3, and having the properties set forth in Example 1 of the Table herein, the lens elements were made of a material having an index of refraction of 1.491; the objective lens 42 had planar surfaces with a thickness of 3.0 mm. between them; its rear surface was in contact with the reticle and spaced 7.239 mm. from the front center of the ocular 44. The ocular 44 was also planar on both surfaces with a thickness of 3.0 mm. between the surfaces. The lens segment 44 conformed to a radius of 5.1 mm. with a conic constant of −0.56 and a thickness of 1.69 mm. from the rear center of the segment to the rear surface of the ocular. The segment and the ocular were molded as a single piece. Both the objective lens and the ocular had an optical clear aperture of 8.9 mm. diameter.

Other examples are listed in the Table. The dimensions are typically in millimeters; and the abbreviations cc and cx are intended to indicate concave and convex, respectively.

TABLE

|  | Example | | | | | |
| --- | --- | --- | --- | --- | --- | --- |
|  | 1 | 2 | 3 | 4 | 5 | 6 |
| Magnification | 1.0 × | 1.0 × | 1.6 × | 0.8 × | 4 × | 1.0 × |
| Ocular Focal Length | inf. | inf. | −20.77 | 38.3 | −16.17 | inf. |
| Ocular Front Radius | planar | planar | 10.2 cc (Back) | 18.8 cx | 9.6 cc (Back) | planar |
| Segment Lens Focal Length | 10.38 | 10.09 | 10.38 | 10.38 | 10.17 | 10.38 |
| Segment Lens Radius | 5.1 cx | 5.235 cx | 5.1 cx | 5.1 cx | 6.0 cx | 5.1 cx |
| Segment Lens Conic Constant | −0.56 | 0.0 | −0.56 | −0.9 | −0.6 | −0.45 |
| Segment Lens Thickness | 1.69 | 3.9 | 1.69 | 1.69 | 3.0 | 15.488 |
| Central Air Space | 7.239 | 4.7 | 7.239 | 7.5 | 44.05 | 0.0 |
| Objective Focal Length | inf. | inf. | 33.2 | 30.55 | 65.17 | inf. |
| Objective Radius | planar | planar | 16.3 cx | 15.0 cc | 32.0 cx | planar |
| Objective Thickness | 3.0 | 3.0 | 3.0 | 3.0 | 4.5 | 0 |
| Front Surface Ocular to Reticle | 7.239 | 4.7 | 7.239 | 6.1 | 8.3 | 0 |
| Objective Index | 1.491 | 1.517 | 1.491 | 1.491 | 1.491 | 1.491 |
| Ocular Index | 1.491 | 1.517 | 1.491 | 1.491 | 1.590 | 1491 |

What is claimed is:

1. An optical sighting device comprising means defining an optical axis having mutually opposite objective and ocular directions, a field of view spaced from said defining means in said objective direction when the device is in use being the object field, a reticle, means for mounting said reticle transversely relative to said axis, a lens element of relatively high positive power, and means for mounting said lens element immediately adjacent to said axis closely spaced in the ocular direction therealong from said reticle, said lens element being effective to focus an image of said reticle on the retina of the eye of a user when his eye is brought close to said lens element, and said lens element being effective visually to block out a portion of the object field in line with said reticle and leaving a relatively large portion of the object field adjacent to said reticle unobstructed.

2. An optical sighting device according to claim 1 including also a Galilean telescope having an objective lens of positive power spaced from said lens element in the objective direction and an ocular lens of negative power spaced in the ocular direction from said objective lens.

3. An optical sighting device comprising a Galilean telescope having a positive objective lens and a negative eyelens spaced therefrom and optically aligned therewith along a preselected optical axis, a selected field of view spaced from the device in the objective direction being the object field of the device, a reticle positioned adjacent to said objective lens and defining an aiming point close to the optical axis, and a lens segment having positive power optically in series with the eyelens for projecting an image of the reticle on the retina of a person using the device, said lens segment serving to obscure light from a portion of the object field and leaving at least a portion of the eyelens and of the object field unobscured so that a person using the device can view the unobscured portion of the object field clearly.

4. An optical sighting device according to claim 3 wherein said lens segment and said eyelens are formed as a single, unitary body.

5. An optical sighting device according to claim 3 wherein said reticle includes a conventional cross-hair having mutually orthogonal sighting lines that lie in a common plane normal to the main optical axis and cross each other near the middle of the objective field, and said lens segment is in the form of a cross bar comprising two mutually orthogonal cylindrical refractive portions of positive power, one of said cylindrical refractive portions being operative to project an image of one of the sighting lines and the other one of said cylindrical refractive portions being operative to project an image of the other one of said sighting lines.

* * * * *